(12) United States Patent
Salokatve

(10) Patent No.: US 9,383,534 B2
(45) Date of Patent: Jul. 5, 2016

(54) PACKAGING FOR A FIBER OPTIC COMPONENT AND MANUFACTURING METHOD THEREOF

(75) Inventor: Arto Salokatve, Tampere (FI)

(73) Assignee: Rofin-Sinar Laser GmbH, Hamburg (DE)

(*) Notice: Subject to any disclaimer, the term of this patent is extended or adjusted under 35 U.S.C. 154(b) by 73 days.

(21) Appl. No.: 13/822,005

(22) PCT Filed: Jan. 4, 2012

(86) PCT No.: PCT/FI2012/050008
§ 371 (c)(1),
(2), (4) Date: Aug. 14, 2013

(87) PCT Pub. No.: WO2012/095559
PCT Pub. Date: Jul. 19, 2012

(65) Prior Publication Data
US 2013/0315548 A1    Nov. 28, 2013

(30) Foreign Application Priority Data

Jan. 11, 2011   (FI) .................................. 20115030

(51) Int. Cl.
*G02B 6/44* (2006.01)
*G02B 6/46* (2006.01)
(Continued)

(52) U.S. Cl.
CPC ............ *G02B 6/4439* (2013.01); *G02B 6/0218* (2013.01); *G02B 6/4429* (2013.01); *G02B 6/46* (2013.01); *H01S 3/06704* (2013.01); *Y10T 29/49826* (2015.01)

(58) Field of Classification Search
CPC .................................... G02B 6/44; G02B 6/45
USPC .................................................... 385/134, 16
See application file for complete search history.

(56) References Cited

U.S. PATENT DOCUMENTS 5,282,258 A  *  1/1994  Hoshino ......................... 385/70
6,428,217 B1     8/2002  Giltner
(Continued)

FOREIGN PATENT DOCUMENTS

CN    101718916 A    6/2010
EP    1318423        6/2003
(Continued)

OTHER PUBLICATIONS

Translation of the JP 2006337955 is attached.*

*Primary Examiner* — Kaveh C Kianni
(74) *Attorney, Agent, or Firm* — Laurence A. Greenberg; Werner H. Stemer; Ralph E. Locher

(57) ABSTRACT

The present invention provides a packaging for a fiber optic component, such as an optical fiber, wherein the heating induced strain to the fiber optic component is minimized, wherein the packaging comprises a first support member having a first coefficient of thermal expansion ($k_1$). The packaging further comprises a second support member, which is resiliently mounted to the first support member for minimizing transfer of thermal expansion induced strain of the first support member to the second support member. The second support member comprises a longitudinal groove open at least on one side of the second support member for receiving a fiber optic component, wherein the second support member has a tensile strength considerably higher than that of the fiber optic component. The second support member has a second coefficient of thermal expansion ($k_2$) substantially smaller than the first coefficient of thermal expansion ($k_1$), wherein the first support member is adapted to exchange heat induced by free-space radiation. The second support member is made of material, such as quartz, which is transparent to the wavelengths used in the component.

9 Claims, 2 Drawing Sheets

(51) Int. Cl.
*G02B 6/02* (2006.01)
*H01S 3/067* (2006.01)

(56) References Cited

U.S. PATENT DOCUMENTS

| | | | |
|---|---|---|---|
| 6,430,350 B1 * | 8/2002 | Bookbinder et al. | 385/136 |
| 6,788,852 B1 * | 9/2004 | Xu et al. | 385/43 |
| 6,821,027 B2 * | 11/2004 | Lee et al. | 385/89 |
| 6,942,399 B2 * | 9/2005 | Takeuchi et al. | 385/99 |
| 6,974,266 B2 * | 12/2005 | Seguin et al. | 385/94 |
| 7,748,913 B2 | 7/2010 | Oba | |
| 2001/0017964 A1 | 8/2001 | Setoguchi | |
| 2002/0037142 A1 * | 3/2002 | Rossi | 385/92 |
| 2003/0007751 A1 | 1/2003 | Shinozaki et al. | |
| 2004/0071415 A1 | 4/2004 | Takeuchi et al. | |
| 2004/0151424 A1 | 8/2004 | Blake et al. | |
| 2007/0189698 A1 * | 8/2007 | Takeuchi et al. | 385/137 |
| 2007/0206909 A1 * | 9/2007 | Wetter et al. | 385/92 |

FOREIGN PATENT DOCUMENTS

| | | |
|---|---|---|
| EP | 1862831 A1 | 12/2007 |
| JP | 3267903 A | 11/1991 |
| JP | H0784139 A | 3/1995 |
| JP | 11287925 A | 10/1999 |
| JP | 2006337955 A | 12/2006 |
| JP | 2007173648 A | 7/2007 |
| JP | 2008293004 A | 12/2008 |
| JP | 2008310277 A | 12/2008 |
| WO | WO 2009155707 A1 | 12/2009 |

* cited by examiner

PACKAGING FOR A FIBER OPTIC COMPONENT AND MANUFACTURING METHOD THEREOF

FIELD OF INVENTION

The present invention relates to packaging of fiber optic components. More precisely, the invention relates to an optical fiber packaging and manufacturing method according to the preamble portions of claims 1 and 11.

BACKGROUND ART

Fiber lasers have gained market share from more conventional laser sources in various industrial applications, where high optical power levels are required to process a work piece. The rising popularity of fiber lasers is due to their high efficiency, high beam quality, and low need of maintenance.

In order for the fiber laser to function reliably as a whole, the fiber optic components thereof, such as pump or signal couplers, must be constructed in a robust manner. When inside of a high-power fiber laser, the fiber optic components may be subject to high optical radiation fluencies. Most of the optical radiation is designed to be guided by the glass structure of the component when operated in the forward direction. However, under some conditions relatively high optical power levels may also leak out of the fiber optic component into free space inside the mechanical package of the component. As an example, radiation reflected back from the work piece may be guided into the fiber optic component in reverse direction compared to the direction the component has been designed to guide radiation. Such free-space radiation within the package of the component will eventually be absorbed by the package, which results in heating of the package.

When pursuing high reliability of the fiber optic component, the package must be designed so that heating of the package does not damage the component. In order to estimate a conceivable heating power level, let us consider a fiber laser operating at a kW output power level. When such a laser is used in processing a metal with high reflectivity, such as copper, a significant portion of the power affecting the work piece may be reflected back into the fiber laser. Part of this back-reflected power is then converted to heat inside a component package. The heating power level in such a situation may therefore be of the order of 100 W.

Thermally induced stresses to the fiber optic component need not necessarily be generated by radiation as described above. During shipment of a laser system temperature may vary by tens of degrees. As a result of that, failure of a component may occur if such temperature variations have not been considered in the design of the package of the component.

Packages made of metals are often used for mounting fiber optic components in them. Two key parameters should be considered when determining the suitability of a given metal as a packaging material. First parameter is the thermal conductivity, which determines how well the material conducts heat away from the point of introduction of the heat load. The second parameter is the coefficient of thermal expansion, which determines how much the metal expands when it is heated. The fiber optic component itself is usually made of fused silica, whose coefficient of thermal expansion is about $5 \cdot 10^{-7}$/K. Metals typically have coefficients of thermal expansion that are at least ten times higher than that of fused silica. Therefore, if the fiber optic component is rigidly mounted to the metal housing, heating thereof will tend to pull the component and cause it to be strained. As the fiber optic components are often very fragile, such strain may break the component.

One may try to alleviate this effect by using metal alloys having a very small coefficient of thermal expansion, such as invar, i.e. FeNi36. However, the thermal conductivity of such an alloy is often significantly smaller than that of pure copper or aluminum, for instance. Thus the benefit of their low coefficient of thermal expansion is generally counteracted by their low thermal conductivity.

One solution is proposed in U.S. Pat. No. 6,942,399, wherein a optical fiber coupler for joining two optical fibers is disclosed. The coupler according to U.S. Pat. No. 6,942,399 comprises a reinforcing member (20), which is housed stably within a cylindrical member (50). The reinforcing member (20) is made of a hard material, such as quartz, a ceramic or an invar, and has a polygonal cross-section and a longitudinal U-shaped groove (22) for receiving the fiber (30, 31). The fiber (30, 31) is fixed at both ends of the groove by means of adhesives (60). The fiber receiving surface (23) of the reinforcing member (20) is subjected to chrome plating, tin plating, or nickel plating.

However, the proposed construction is unable to effectively minimize strain directed to the fiber optic component as the reinforcing member is made of material that, upon receiving stray radiation from the optical fiber, is unable to transfer the heat away from the fiber.

AIM OF THE INVENTION

It is therefore an aim of the present invention to provide a packaging for a fiber optic component, such as an optical fiber, wherein the heating induced strain to the fiber optic component is minimized.

SUMMARY

On the one hand, the aim is achieved with a novel fiber optic component packaging comprising a first support member having a first coefficient of thermal expansion. The packaging further comprises a second support member, which is resiliently mounted to the first support member for minimizing transfer of thermal expansion induced strain of the first support member to the second support member. The second support member comprises a longitudinal groove open at least on one side of the second support member for receiving a fiber optic component, wherein the second support member has a tensile strength considerably higher than that of the fiber optic component. The second support member has a second coefficient of thermal expansion substantially smaller than the first coefficient of thermal expansion, wherein the first support member is adapted to exchange heat induced by free-space radiation. The second support member is made of material, such as quartz, which is transparent to the wavelengths used in the component.

More specifically, the packaging according to the invention is characterized by the characterizing portion of claim 1.

On the other hand, the aim is achieved with a novel method of producing a fiber optic component packaging, in which method a first and a second support member are provided such that the material of the second support member has a substantially smaller coefficient of thermal expansion than that of the first support member. The second support member is made of material, such as quartz, which is transparent to the wavelengths used in the component. The second support member is resiliently mounted to the first support member and a fiber optic component is attached to the second support member.

More specifically, the method of producing a fiber optic component packaging according to the invention is characterized by what is stated in claim 11.

Considerable benefits are gained with aid of the present invention. Because the second support member has a coefficient of thermal expansion substantially smaller than the first coefficient of thermal expansion, the material of the first support member can be so selected as to efficiently dissipate heat generated by free-space radiation that gets absorbed by the first support member. In other words, temperature increase of the package can be minimized since no strict restriction to the magnitude of the first coefficient of thermal expansion is imposed. Furthermore, the resilient connection between the first and second support member minimizes transfer of thermal expansion induced strain of the first support member to the second support member. In combination, the packaging is adapted to minimize heating induced strain to the fiber optic component. The packaging method of the present invention is also quite simple and easy to exercise in practice. Ability to use relatively cheap materials with simple geometries enables low-cost, industrially viable packaging of highly reliable components.

BRIEF DESCRIPTION OF THE DRAWINGS

In the following, preferable embodiments of the invention are described with reference to the accompanying drawing, in which.

DETAILED DESCRIPTION OF PREFERRED EMBODIMENTS

Figure 1:
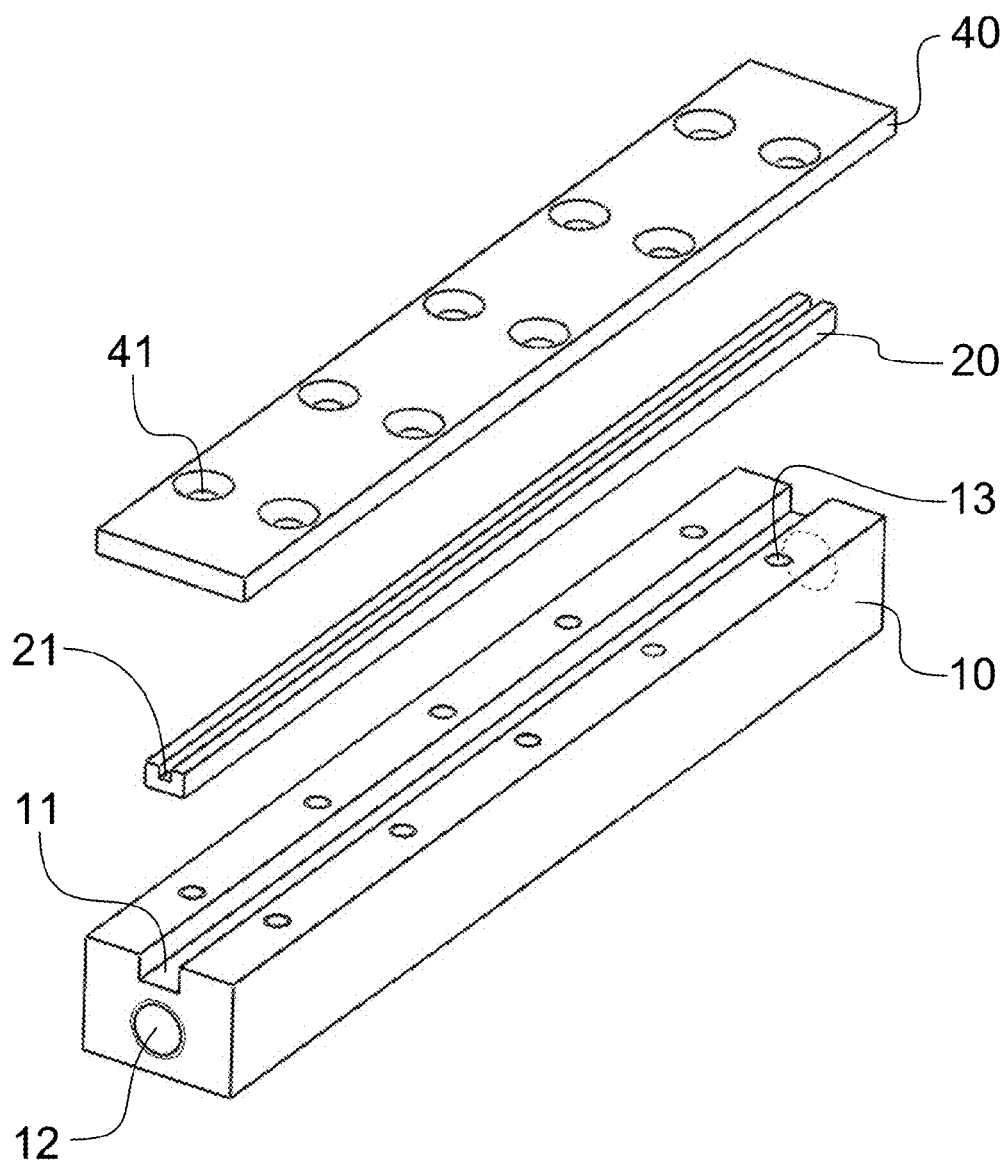
FIG. 1 presents an exploded view of an optical fiber component packaging according to one embodiment of the invention.
Figure 2:
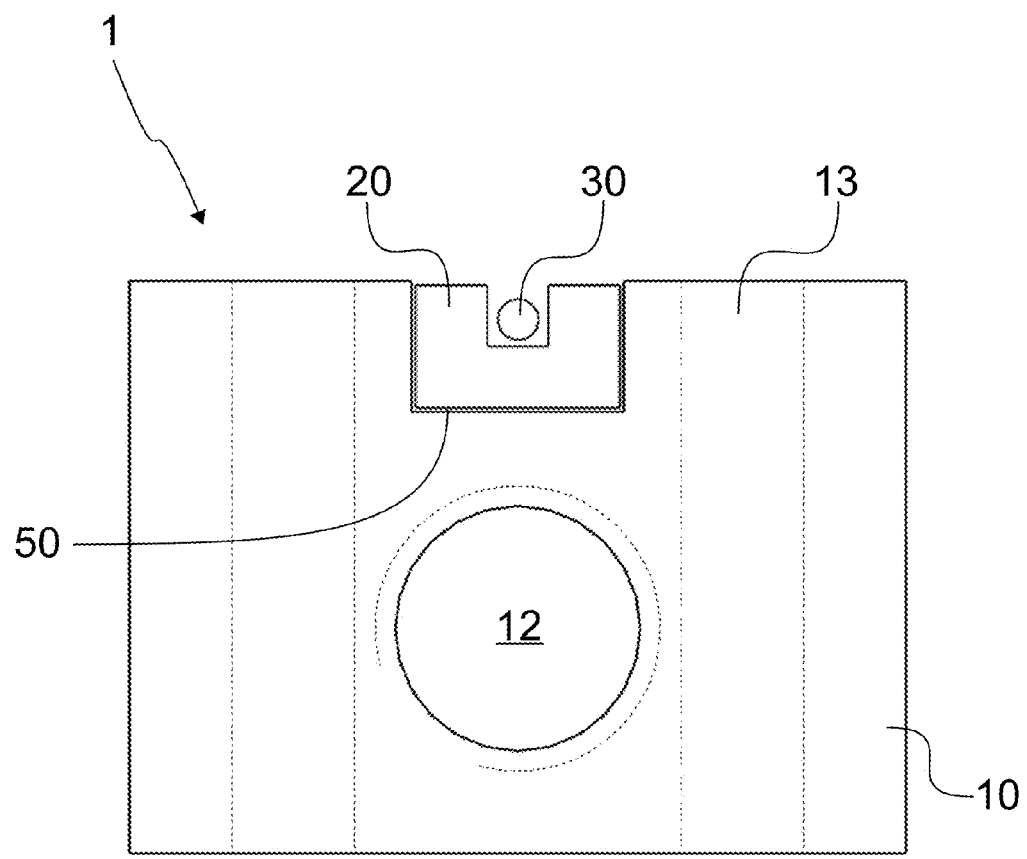
FIG. 2 presents a cross-section view of the assembled packaging of FIG. 1 without a lid member.

As can be seen in FIGS. 1 and 2, the fiber optic component packaging 1 according to the invention comprises a first support member 10 having a first coefficient of thermal expansion $k_1$. The packaging also comprises a second support member 20 having a second coefficient of thermal expansion $k_2$. A fiber optic component 30, such as an optical fiber, is mounted to a longitudinal groove 21 of the second support member 20 and preferably attached thereto by means of adhesive applied to both ends of the groove 21. In other words, the second support member 20 acts as a sub-mount for the fiber optic component 30. The second support member 20 is further mounted to a corresponding longitudinal and rectangular groove 11 of the first support member 10.

The attachment of the second support member 20 to the first support member 10 is done resiliently in order to minimize the transfer of thermal expansion induced strain of the first support member 10 to the second support member 20. The resilient interface or fixation agent 50 between the first and second support members 10, 20 preferably has a substantially lower shear modulus than that of the second support member 20 in order to minimize the strain of the second support member 20 due to thermal expansion of the first support member 10. The resilient agent 50 is preferably applied to each mating surface between the groove 11 of the first support member 10 and the second support member 20, i.e. surrounding the second support member 20. The resilient agent 50 can be of flexible adhesive, such as silicone, optical adhesive, polyurethane adhesive or similar. Typically a flexible elastomer like silicone has a shear modulus of about 1 MPa, while that of quartz is about $3 \cdot 10^{10}$ Pa or factor of 30 000 larger. A soft optical adhesive may have a shear modulus of the order of 10 MPa, which is still significantly smaller than that of quartz. Thus, in practice most of the strain caused by the thermal expansion of the first support member 10 is taken up by the resilient interface agent. As the second support member 20 does not experience the strain due to thermal expansion of the first support member 10, the strain induced to the fiber optic component 30 will also be minimal.

The resilient agent 50 may, but need not be applied along the whole length of the groove 11 of the first support member 10. As an example, the resilient agent 50 can be applied only to one end of the groove 11.

According to one embodiment, the second coefficient of thermal expansion $k_2$ is substantially similar to that of the fiber optic component $k_3$. Fiber optic components 30, such as optical fibers, are typically made of fused silica or the like. According to a particularly preferable embodiment, the second coefficient of thermal expansion $k_2$ is thus that of fused silica. Accordingly, the relative magnitude of $k_1$ may be selected rather freely due to the resilient interface between the first and second support members 10, 20. Therefore, the material of the first support member 10 may be selected largely based on its thermal conductivity, price and possibly some mechanical properties.

As said, a variety of materials may be used in connection with the present invention. According to one embodiment the first support member 10 is made of copper. The second support member 20 may be made of material having better optical but poorer thermal conductivity properties. According to one embodiment, the second support member 20 is made of quartz. Being made of quartz, the second support member 20 is transparent to typical wavelengths, whereby radiation emanating from the fiber optic component 30 as scattered light for example does not substantially directly heat the second support member 20. As a result, said radiation is absorbed to the first support member 10 made of copper, whereby it is heated and able to exchange heat away from the fiber optic component 30. Simultaneously, the heat in the first support member 10 may also heat the second support member 20. However, this portion of the generated heat is not detrimental to the fiber optic component 30 because thermal expansion of quartz (0.5 ppm per degree) is significantly smaller than copper (17 ppm per degree).

In an alternative embodiment the first support member 10 is made of aluminium. Aluminium is a relatively cheap material, has good thermal conductivity, and is easy to machine. In this embodiment the second support member 20 is made of quartz, which is the preferred material when fiber optic components made of fused silica are concerned.

Cooling of the first support member 10 may be arranged either passively by mounting the first support member 10 onto a larger heat sink or actively by arranging a coolant flow through channel 12 thereof. Channel 12 is preferably equipped with couplings for assisted connection to the cooling system. The first function of the first support member 10 is to absorb the free-space radiation and turn it to heat, and conduct the heat efficiently to the heat sink agent. The second function of the first support member 10 is to provide mechanical protection for the component 30 and the second support member 20.

The second support member 20 preferably has a substantially larger, preferably at least ten times larger, tensile strength than that of the fiber optic component 30. According to one embodiment, the relative tensile strengths of the second support member 20 and the fiber optic component 30 is provided by arranging the area of the cross section of the second support member 20 substantially, preferably at least ten times higher, than that of the fiber optic component 30. The cross section of a typical fiber optic component 30 is less than 1 mm² in area. Therefore, the second support member 20 preferably has a cross section of at least 10 mm² in area.

The packaging 1 is preferably closed by a lid member 40, which encapsulates the groove 21 of the second support member 20 and the fiber optic component 30 into a housing formed by the first support member 10 and the lid member 40. The surfaces of the first and second support members 10, 20 facing the lid member 40 are therefore preferably flush. The lid member 40 may be fixed to the first support member 10 by means of screws or alike extending through aligned holes 41, 13 provided to the lid and first support members 40, 10, respectively. Alternatively, the lid member 40 may be attached by other means, such as adhesive or a form fitting joint. The lid member 40 may further be attached to the first support member 10 by arranging a hermetic seal between the two for improved integrity.

Manufacture of a fiber optic component packaging 1 described above is preferably arranged such that a first support member 10 and a second support member 20 are provided from suitable materials as described above. A subassembly is formed by attaching the second support member 20 to the groove 11 of the first support member 10 by means of a resilient adhesive, such as silicone. The fiber optic component 30, such as an optical fiber, is attached to the second support member 20 after the resilient adhesive has cured to an adequate extent. The component 30 is attached to the second support member 20 at opposing ends thereof preferably by means of adhesive. The packaging 1 is finally closed by attaching the lid member 40 to the first support member 10, whereby a housing for the fiber optic component 30 is formed by the first support member 10 and the lid member 40. Coolant connectors are preferably coupled to the couplings of the coolant channel 21 for active cooling.

TABLE 1

List of reference numbers.

| Number | Part |
|---|---|
| 1 | packaging |
| 10 | first support |
| 11 | longitudinal groove |
| 12 | cooling channel |
| 13 | hole |
| 20 | second support |
| 21 | longitudinal groove |
| 30 | fiber optic component |
| 40 | lid member |
| 41 | hole |
| 50 | resilient adhesive |

The invention claimed is:

1. Fiber optic component packaging, comprising:
a first support member having a first coefficient of thermal expansion ($k_1$),
a second support member having a second coefficient of thermal expansion ($k_2$), the second support member being resiliently mounted to the first support member for minimizing transfer of thermal expansion induced strain of the first support member to the second support member and comprising a longitudinal groove open at least on one side of the second support member for receiving a fiber optic component, wherein the second support member has a tensile strength considerably higher than that of the fiber optic component,
wherein the second coefficient of thermal expansion ($k_2$) is substantially smaller than the first coefficient of thermal expansion ($k_1$),
wherein the first support member is adapted to exchange heat induced by free-space radiation,
wherein the second support member is made of material which is transparent to wavelengths used in the fiber optic component, and
wherein the first support member comprises a channel which is adapted to receive a coolant flow for active cooling.

2. Fiber optic component packaging according to claim 1, wherein the fiber optic component mounted into the groove of the second support member has a third thermal coefficient of expansion ($k_3$).

3. Fiber optic component packaging according to claim 1, wherein second coefficient of thermal expansion ($k_2$) is substantially similar to that of the fiber optic component (k).

4. Fiber optic component packaging according to claim 1, wherein the area of the cross section of the second support member is substantially larger than that of the fiber optic component.

5. Fiber optic component packaging according to claim 1, wherein the area of the cross section of the second support member is at least ten times higher than that of the fiber optic component.

6. Fiber optic component packaging according to claim 1, wherein the first support member comprises a longitudinal groove for receiving the resiliently attached second support member.

7. Fiber optic component packaging according to claim 1, wherein the packaging comprises a lid member encapsulating the second support member and the fiber optic component into a housing formed by the first support member and the lid member.

8. Fiber optic component packaging according to claim 1, which further comprises a resilient agent between the first and second support members being a flexible elastomer.

9. Fiber optic component packaging according to claim 8, wherein the resilient agent between the first and second support members has a substantially lower shear modulus than that of the second support member for minimizing the strain thereof due to thermal expansion of the first support member.

* * * * *